United States Patent [19]
Carter et al.

[11] Patent Number: 5,914,971
[45] Date of Patent: Jun. 22, 1999

[54] DATA ERROR DETECTOR FOR BIT, BYTE OR WORD ORIENTED NETWORKS

[75] Inventors: Michael Carter, Clayton; Mark Kocher, Raleigh; Rodney B. Washington, Raleigh; Timothy B. Phillips, Raleigh; George Edmund Burke, Jr., Raleigh, all of N.C.; Dennis J W Dube, Pelham, N.H.

[73] Assignee: Square D Company, Palatine, Ill.

[21] Appl. No.: 08/837,730

[22] Filed: Apr. 22, 1997

[51] Int. Cl.$^6$ ...................................................... H04L 1/08
[52] U.S. Cl. .................. 371/69.1; 371/68.1; 371/67.1; 371/20.1; 371/70; 324/509
[58] Field of Search .................. 371/69.1, 68.1, 371/20.1, 67.1, 48, 70; 324/509

[56] References Cited

U.S. PATENT DOCUMENTS

4,782,300 11/1988 Bonaccio et al. ........................ 324/509
5,696,777 12/1997 Hofsaess ................................ 371/68.1

*Primary Examiner*—Phung M. Chung
*Attorney, Agent, or Firm*—Larry I. Golden; David R. Stacey; Larry T. Shrout

[57] ABSTRACT

A data error detection method for a bit, byte or word oriented network wherein a protected data unit 46 and an associated data check unit 50 are addressed to a particular field device located on the network, 10 or 26. The data check unit 50 is derived in a particular manner either solely from the protected data unit 46 or from the protected data unit 46 and particular binary codes representing attributes of the network 10 or 26 and the field device sending the protected data unit 46. The particular configuration of the checking data unit 50 is such that the receiving field device or the host 22 can perform a bit-by-bit comparison of either the received protected data unit 46 or data check unit 50 with a protected data unit 46 or data check unit 50 derived in the particular manner by the receiving host 22 or field device 14 or 18.

34 Claims, 8 Drawing Sheets

| MUX CHANNEL NO. | MUX CODE | MUX CHANNEL NO. | MUX CODE |
|---|---|---|---|
| 0 | 1111 | 8 | 1110 |
| 1 | 0111 | 9 | 0110 |
| 2 | 1011 | 10 | 1010 |
| 3 | 0011 | 11 | 0010 |
| 4 | 1101 | 12 | 1100 |
| 5 | 0101 | 13 | 0100 |
| 6 | 1001 | 14 | 1000 |
| 7 | 0001 | 15 | 0000 |

| FIELD DEVICE ADDRESS | ADDRESS CODE | FIELD DEVICE ADDRESS | ADDRESS CODE |
|---|---|---|---|
| WORD 016 | 1000 | WORD 144 | 0001 |
| WORD 032 | 0100 | WORD 160 | 1001 |
| WORD 048 | 1100 | WORD 176 | 0101 |
| WORD 064 | 0010 | WORD 192 | 1101 |
| WORD 096 | 1010 | WORD 208 | 1011 |
| WORD 112 | 0110 | WORD 224 | 1011 |
| WORD 128 | 1110 | WORD 240 | 0111 |

| NETWORK OPERATING MODE | FIELD DEVICE TYPE | OPERATING MODE CODE |
|---|---|---|
| PEER-TO-PEER | INPUT | 1000 0000 |
| PEER-TO-PEER | OUTPUT | 1000 0000 |
| HOST | INPUT | 0010 0000 |
| HOST | OUTPUT | 0001 0000 |

DATA ERROR DETECTOR FOR BIT, BYTE OR WORD ORIENTED NETWORKS

FIELD OF THE INVENTION

The present invention relates to the field of data communication over a network and particularly to data error detection on bit, byte or word oriented networks.

BACKGROUND OF THE INVENTION

The need for maintaining the validity of data which is moved from one device to another over a time division multiplexed network is well known. If data becomes corrupt during transit, the receiving device can produce an improper response. Data is transferred over the network in bits represented by "1's" or "0's". Each bit occupies one time slot of a data frame and can be addressed individually as a data unit, or bits can be arranged in byte or word sized data units wherein each byte or word sized data unit is addressed individually. A frame sized unit is made up of a number of bit, byte or word sized data units. Data corruption usually occurs in the form of noise in the network transmission line which changes the state of one or more of the bits in a data unit being transferred on the network. In more sophisticated network operations, data is transferred between the host device (CPU) and field devices (I/O devices) in complete frames. In this type of network communication, each field device connected to the network reads the complete frame and then the addressed field device responds to the host device with a complete frame of information. The check sum or CRC error detection method is generally used for these more sophisticated networks. Parity error checking is also a commonly used method of checking for data errors on a network. Parity checking is less complicated than CRC error checking and can be used with bit, byte, word or frame length data units. Parity can be either ODD or EVEN. Parity checking is accomplished by adding the number of data bits having a value of "1" in the data unit to be transmitted and then adding the parity bit or bits required to get the desired ODD or EVEN total for the transmitted data unit. The receiving host or field device receives the transmitted data unit and calculates the parity bit or bits required to give the desired ODD or EVEN total for the received data unit. If the parity bit or bits calculated by the receiving device matches the parity bit or bits sent by the sending device the data is good. If the calculated parity bit or bits does not match the parity bit or bits sent by the sending device there is a parity error in the received data. Therefore, due to the nature of its error checking process, parity error checking has only a 50% probability of detecting data errors.

Time slot bleedover is another form of data error which can occur when data is transmitted over a network. In this application time slot bleedover is defined as data from one time slot corrupting data from the next succeeding time slot due to the inability of the network line capacitance to charge or discharge before data in the next time slot is read from the network bus. Time slot bleedover error checking is very important in bit, byte or word oriented networks wherein each field device reads only the bit, byte or word sized data unit in the frame which is addressed to it and provides a bit, byte or word sized output in response to the information read from the network. Time slot bleedover errors can be detected by the more sophisticated and expensive check sum and CRC detection methods but parity error checking with its 50% probability of detecting data errors is much less likely to detect a time slot bleedover error.

In time division multiplexed networks, it is also possible for transmission line noise or time slot bleedover to corrupt the multiplex channel address which is transmitted as a binary number. Therefore, it is important to check for data errors in the multiplex channel address as well as in the data units of the frame being transmitted on a particular multiplexed channel address.

It is possible that a network may contain field devices which are not capable of data error checking or which may not require data error checking as well as field devices which are capable of, and do require data error checking. In some applications, it can be desirable to disable data error checking for some or all field devices such that the maximum number of field devices can be connected to the network. Therefore, some method for selectively enabling or disabling the data error checking method should be provided to both the host and the field devices such that both data error checking devices and non-data error checking devices can operate on the same network.

SUMMARY OF THE INVENTION

The error detection method of the present invention is a multi-level error detection method which is simpler in operation than check sum or CRC, more reliable than parity checking and at its lowest level provides both noise and time slot bleedover error detection in bit, byte and word oriented networks. The method of the present invention also provides data error detection in multiplex channel addresses, field device address and predetermined error response depending on the network operating mode and type of field device sending the corrupted data. In the present invention, error detection can be selectively enabled or disabled for each field device on the network. A particular field device, with error detection enabled, places a protected bit, byte or word sized data unit on the network. This protected data unit is addressed to one or more field devices also on the network. Within the same frame, the particular field device also places an error checking bit, byte or word sized data unit associated with the protected data unit and addressed to the same field device or devices on the network. If a host device is present on the network, it will receive both the protected data unit and the error checking data unit. Data in the error checking data unit is a derivative of the data in the protected data unit such as an exact binary complement of the data in the protected data unit or a particular combination of the data in the protected data unit, the multiplex channel address and the field device address or other binary codes associated with attributes of the network or particular field devices. The host or field device to which the protected data unit is addressed reads both the protected data unit and the error checking data unit from the network. If the error checking data unit is intended to be an exact binary complement to the protected data unit, the receiving field device or host compares the checking data unit bit by bit with the protected data unit to verify that it is an exact binary complement to the protected data unit. If the error checking unit is not an exact binary complement of the protected data unit, the protected data or the error checking data has been corrupted during the network transmission. If the error checking unit is intended to be a particular combination of the data in the protected data unit, the multiplex channel address, the field device address and the network operation mode, the receiving field device or host performs an exact reversal of the particular combination and checks bit by bit the results with the data received in the protected data unit. If the result of the exact reversal of the particular combination is not an exact bit by bit copy of the data in the protected data unit, the protected data or the error checking data has been corrupted during the network transmission. A host device or field device reading and verifying corrupted data, whether protected data or error checking data, will respond in a predetermined manner to prevent an undesirable response. The predetermined response to corrupted data by the host device or individual field devices can be user selectable from a number of choices provided by the manufacturer of the host software and field devices.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Figure 1:
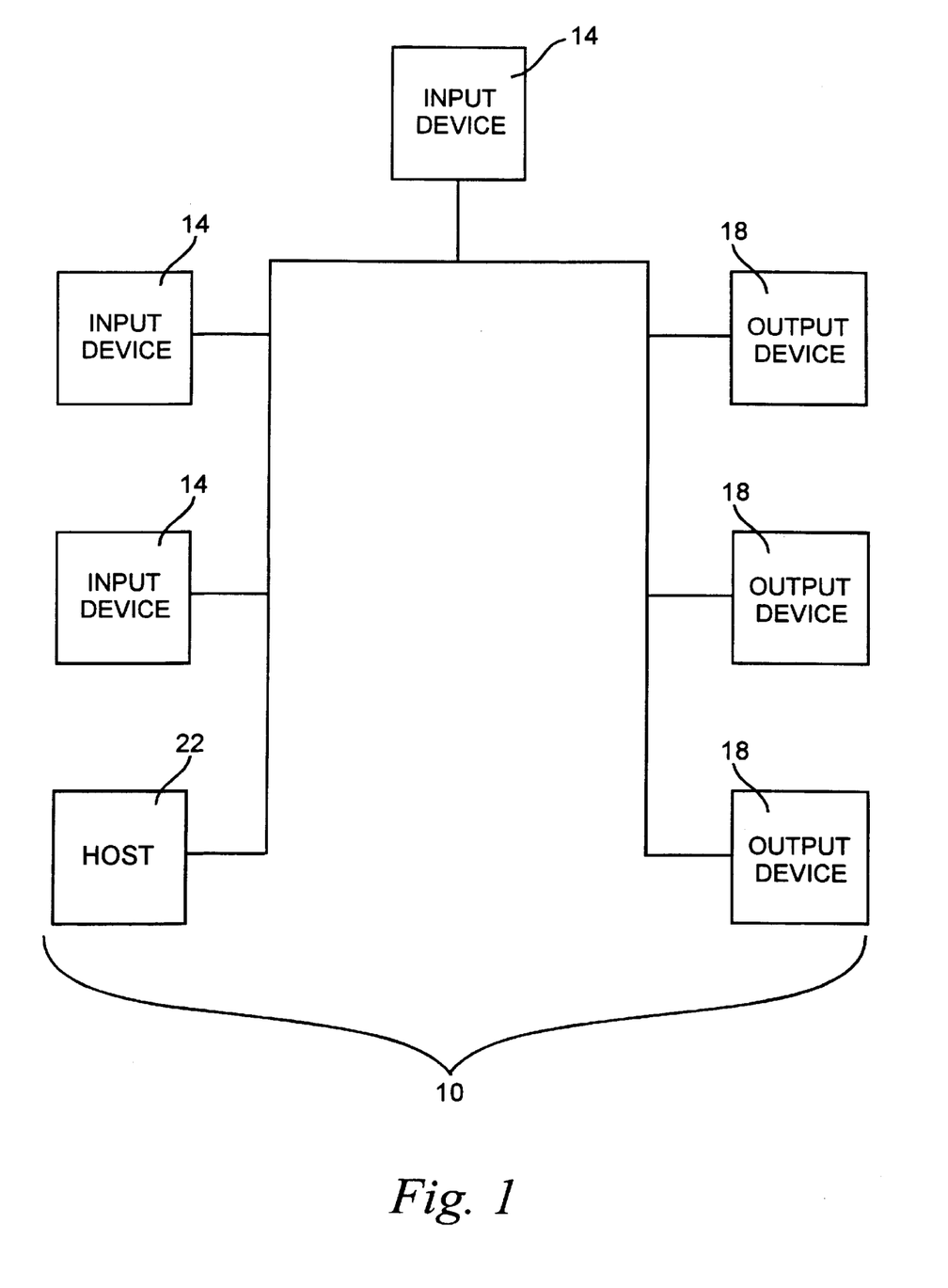
FIG. 1 is a block diagram of a network having input devices, output devices and a host.

FIG. 1 is a block diagram of a network or distributed bus generally indicated by reference numeral 10. The network 10 includes a number of input devices 14 and output devices 18, each of which has an assigned address on the network 10, and a host 22, thus making it a host or master-slave network. The addresses may or may not be unique to the particular input or output device, 14 or 18 respectively, to which they are assigned. The input devices 14 are generally bit level devices such as pushbuttons, foot switches, key switches, optical sensors, proximity switches, limit switches, etc., or multi-bit level devices such as bar code readers, encoders or keyboards,. The output devices 18 are generally pilot lights, relays, etc. Input and output devices, 14 and 18 respectively, will be collectively referred to as "field devices" in this application. The host 22 is generally a computer or other device having a central processing unit (CPU), a nonvolatile memory storage area for maintaining an application program and information related to user selected operation options for each individual field device 14 or 18 on the network and a volatile memory storage area for temporarily maintaining data required by the application program to operate the network 10.

Figure 2:
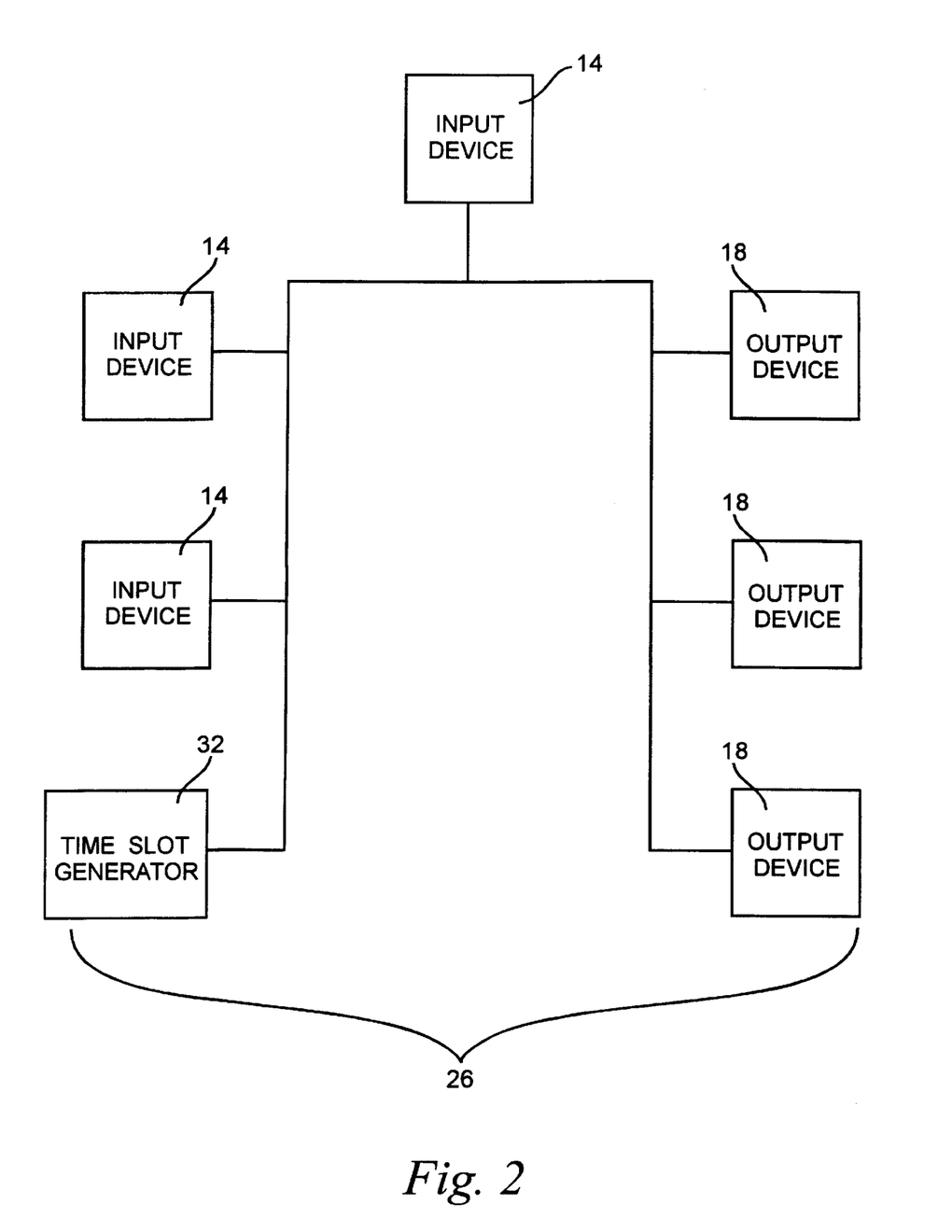
FIG. 2 is a block diagram of a peer-to-peer network having input and output devices and a time slot generator.

FIG. 2 is a block diagram of a peer-to-peer network, generally indicated by reference numeral 26, wherein the input devices 14 communicate directly with the output devices 18 without a host 22 interface.

In both networks, 10 and 26, information is passed back and forth between the input devices 14 and output devices 18 in the form of data bits 30 represented by "1's" and "0's". Each data bit 30 occupies one time slot which is generated by a time slot generator 32. In a host network 10 the host 22 generates the time slots, in a peer-to-peer network 26 the time slot generator 32 may be a dedicated device or it can be a function of one of the input or output devices, 14 or 18, respectively. The "1's" and "0's" of the data bits 30 represent voltage levels of an electrical signal placed on the networks, 10 and 26, by the input and output devices, 14 and 18, respectively, and are susceptible to electrical noise. Since output devices 18 respond to signals placed on the network 10 or 26 by input devices 14 or the host 22, it is important to know when data has been corrupted while moving on the network from one field device 14 or 18 to another field device 14 or 18 or between field devices 14 or 18 and the host 22.

Figure 3:
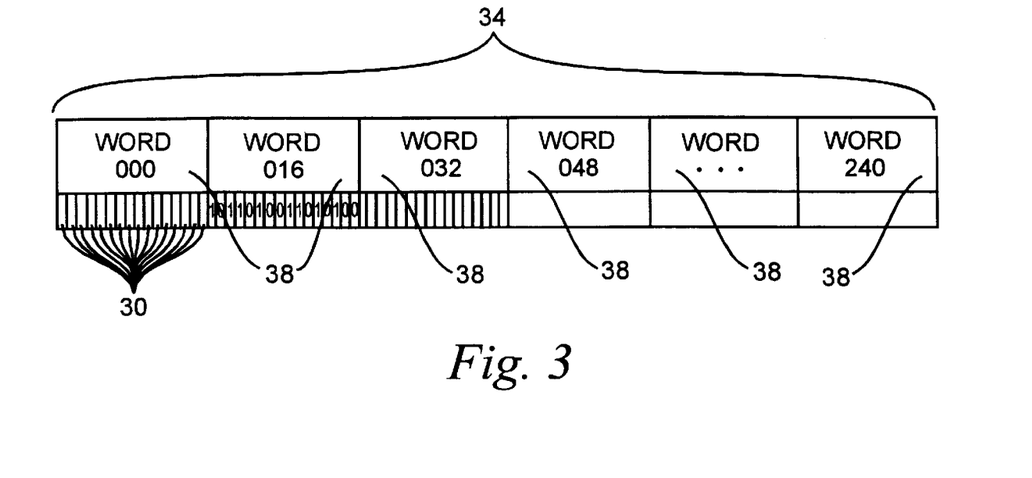
FIG. 3 is a graphical representation of a data frame comprised of word sized input or output devices without data validation protection in accordance with the present invention.

Referring now to FIG. 3, information is generally passed over a network 10 or 26, as shown in FIGS. 1 and 2, in a frame, generally indicated by reference numeral 34, which includes a number of sequential time slots each associated with one data bit 30. The frame 34 is subdivided into a number of bit, byte or word sized units, which for simplicity in this discussion will collectively be referred to as data units 38. Bit sized data units 38 each have one data bit 30 while byte or word sized data unit 38 can be any number of data bits 30. Generally each byte or word sized data unit 38 within a frame 34 will have the same number of data bits 30. While a frame 34 can have any number of data bits 30 or data units 38, for the purpose of this discussion the frame 34 will have 256 data bits 30 (sequential time slots 000 through 255) and will be subdivided into word sized data units 38 each having 16 data bits 30 and/or byte sized data units 38 each having 8 data bits 30. Also for the purpose of this discussion, the address of an input or output device, 14 or 18 respectively, on the network, 10 or 26, will be defined by the sequential time slot of the starting data bit 30 for the data unit 38 with which it is associated (i.e. word 016, word 032, . . . word 240, etc.). The first data unit 38 of each frame 34 is generally reserved for frame synchronization data and any miscellaneous frame related data which is required, in this case this information would reside in word 000. Data which is to be transmitted over the network 10 or 26 is stored in the data units 38 as a binary number, for example 1011 0100 1101 0100, as shown in word 016.

Figure 4:
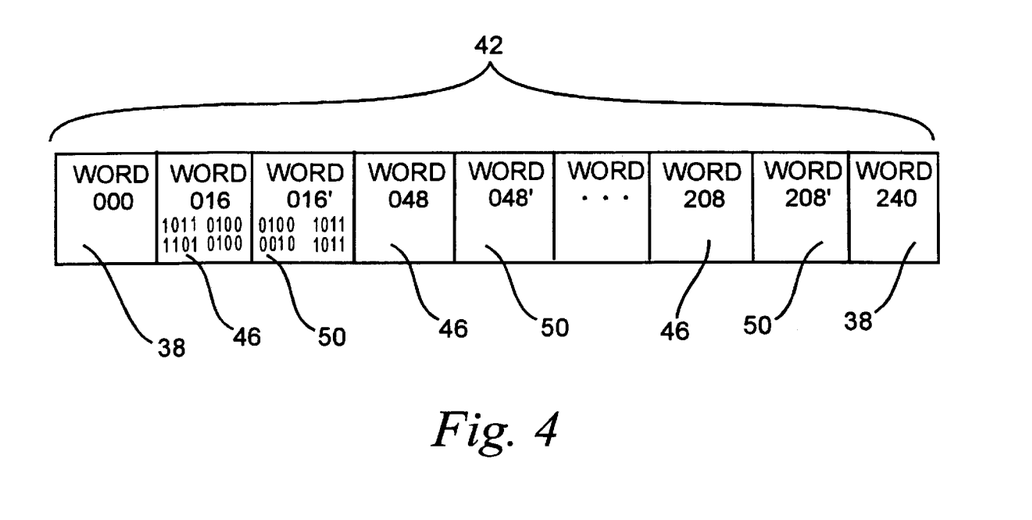
FIG. 4 is a graphical representation of a data frame comprised of word sized input or output units with data validation protection in accordance with the present invention.

Data error detection in accordance with the present invention can be selectively enabled or disabled on each field device 14 or 18 of a network 10 or 26 by setting switches or jumpers, etc., or by programming. The enabled or disabled state of data error detection for each field device 14 or 18 on the network 10 is recorded in the nonvolatile memory of the network host 22. FIG. 4 illustrates a frame 42 wherein data error detection in accordance with the present invention has been selectively enabled on each of the field devices 14 or 18 addressed in the particular frame 42. Data error detection in accordance with the present invention can also be employed in any one of a number of expanding levels from protecting only the data placed on the network by a field device 14 or 18 to protecting the data placed on the network, the field device 14 or 18 address, the multiplex channel address and the predetermined response to corrupted data based on the network operation mode and the type of field device 14 or 18 placing the protected data on the network. Therefore, the following discussions of error detection in accordance with the present invention will begin at the lowest level and progress to the highest level of error detection. The frame 42 is subdivided into at least one unprotected data unit 38 for synchronization and miscellaneous frame related information, a number of protected data units 46 and an equal number of data check units 50. Each data check unit 50 is associated with a particular one of the protected data units 46 and is derived, in some particular manner, by means of software or hardware, from its associated protected data unit 46. In this example, at least one data unit 38 is used for synchronization and miscellaneous information related to the frame 42. Since each protected data unit 46 requires an associated data check unit 50, the maximum number of protected data units 46 available in the frame 42 is the integer value of (N−1)/2, wherein N is the number of data units 38 in the frame 42. Therefore, in this example, a maximum of (7) seven protected data units 46 are available in frame 42 with word 016 being the first data unit 38 available for use as a protected data unit 46 or a data check unit 50. The data to be protected in the protected data unit 46 (Word 016) is in the form of a binary number, for example 1011 0100 1101 0100. In this example, the data check unit 50 (Word 016') is particularly derived from its associated protected data unit 46 in a manner such that it is the exact binary complement of the protected data unit 46, thus giving the binary number 0100 1011 0010 1011. In another embodiment representing a higher level of data error detection, the particular manner of deriving the data check unit 50 requires that the binary number of the data check unit 50 be an exact binary complement of the protected data unit 46 but in reverse order, thus giving the binary number 1101 0100 1101 0010. When the protected data unit 46 and its associated data check unit 50 are located immediately adjacent one another in the frame 42, as shown in FIG. 4, this embodiment will detect a time slot bleedover error wherein the last data bit 30 from the protected data unit 46 (Word 016) bleeds over into the first data bit 30 of the data check unit 50 (Word 016'). A time slot bleedover error of this type will be detected regardless of the order of the protected data unit 46 and the data check unit 50 within the frame 42 as long as they are immediately adjacent to one another.

Error detection in accordance with the present invention is a function of the host 22 or the receiving field device 14 or 18. When received by the host 22 or a field device 14 or 18 to which the data units 46 and 50 are addressed, the data will be verified by reading the binary number in the protected data unit 46 and deriving, in the particular manner, the associated data check unit 50. This data check unit 50 derived by the host 22 or receiving field device 14 or 18 is then compared bit-by-bit with the data check unit 50 received from the host 22 or sending field device 14 or 18. If the two are identical, the received protected data unit 46 has not been corrupted; if they are not identical, one of the received protected data unit 46 or the data check unit 50 has been corrupted. This error detection process can also be accomplished by using the received data check unit 50 and exactly reversing the particular manner in which it was derived from its associated protected data unit 46. The protected data unit 46 derived from the received data check unit 50 by the host 22 or receiving field device 14 or 18 is then compared bit-by-bit with the protected data unit 46 received from the host 22 or sending field device 14 or 18. If the two are identical, the received protected data unit 46 has not been corrupted; if they are not identical, one of the received protected data unit 46 or the data check unit 50 has been corrupted. The deriving of or reversing of the particular deriving manner and the bit-by-bit comparison can be accomplished by means of software or hardware.

In the example of FIG. 4, the received data check unit 50 of Word 016' should be the exact binary complement of the received protected data unit 46 of word 016. If, after the bit-by-bit comparison, the binary number in word 016' is found to be the exact binary complement of the binary number in word 016, the data in word 016 is good and will be accepted and processed by the host 22 or receiving field device 14 or 18. If, after the bit-by-bit comparison, the binary number in word 016' is found not to be the exact binary complement of the binary number in word 016, the data in word 016 is potentially corrupt and will be rejected by the host 22 or the receiving field device 14 or 18.

The following is a comparison of parity data error checking with data error checking in accordance with the present invention as described above for a time slot bleedover data error. In a time slot bleedover error, the "1" valued bits of the binary number have failed to be sufficiently discharged before the next time slot (data bit 30) is read, thereby causing a time slot bleedover into a succeeding "0" valued bit. For this comparison, a data unit 38 comprised of 8 data bits 30 (a byte sized data unit as previously defined) will be used. The data unit 38 to be placed on the network 10 or 26 by a host 22 or field device 14 or 18 is a binary number, for example 0101 1011. The sum of the "1's" in the data unit is 5; therefore, if EVEN parity is required, a parity "check bit" having a value of "1" must be sent with the data unit 38. The sum of the "1's" in the data unit plus the "1" value of the parity error "check bit" give the data unit a "1's" value of 6 or EVEN parity. A time slot bleedover error wherein the "1" valued data bits 30 have failed to be sufficiently discharged before the next time slot (data bit 30) is read can cause a succeeding "0" valued data bit 30 to become a "1" valued data bit 30. The sum of the "1" valued data bits 30 of the corrupted data unit 38 can still indicate EVEN parity when added to the "check bit" also sent with the data unit 38. A time slot bleedover error occurring in the example data unit 38 could produce the binary number 0111 1111 in which the sum of the "1's" is 7 plus the "check bit" is 8 or EVEN parity. In this example, the results of parity error checking of the correct data unit 38 and the time slot bleedover corrupted data unit 38 are the same. In any instance wherein the sum of the "1's" of the good data unit 38 binary number originally placed on the network 10 or 26 and the sum of the "1's" of the corrupted data unit binary number actually received by the addressed field device 14 or 18 are the same, parity error checking can give a false indication of good data received. Thus, parity error checking can incorrectly indicate that a good data unit 38 has been received. Error detection in accordance with the present invention is a bit-by-bit comparison of the protected data unit 46 and the data check unit 50 which are placed on the network 10 or 26 within the same frame 42. The bit-by-bit comparison is performed by the receiving field device 14 or 18 or host 22 and does not rely on a sum of the "1's" in either of the protected data unit 46 or the data check unit 50.

Figure 5:
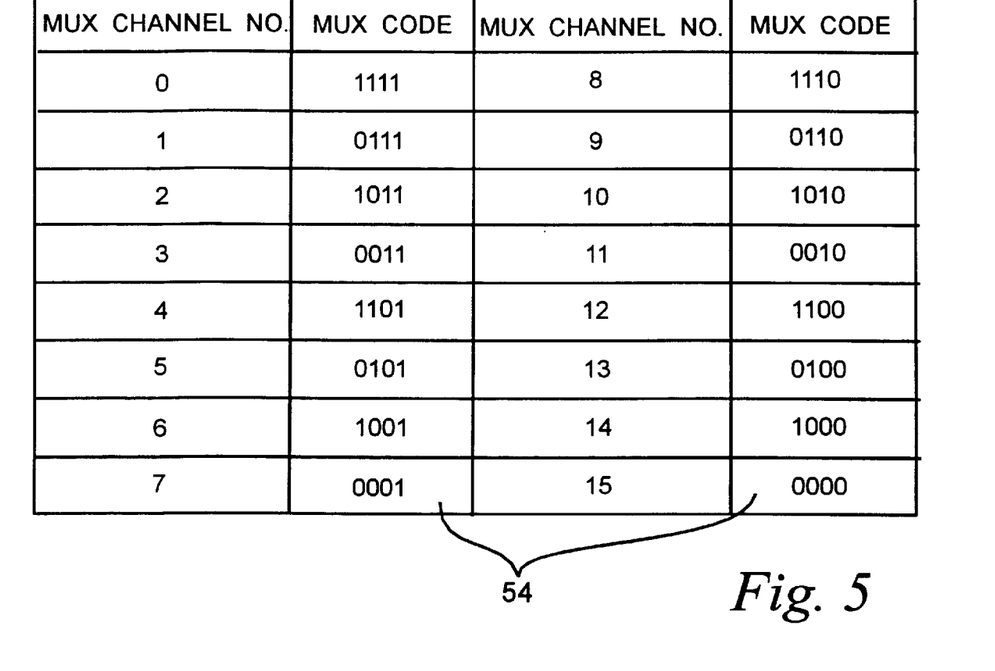
FIG. 5 is a table displaying multiplexed channels and their associated address codes in accordance with the present invention.

Data error detection in accordance with the present invention can also be used to detect noise or time slot bleedover error in a multiplexed channel address. Each multiplex channel can be assigned an associated multiplex channel address code 54 in the form of a binary number as shown in FIG. 5. This binary number can be checked for data error in the same manner as described above for the protected data units 46.

Figure 6:
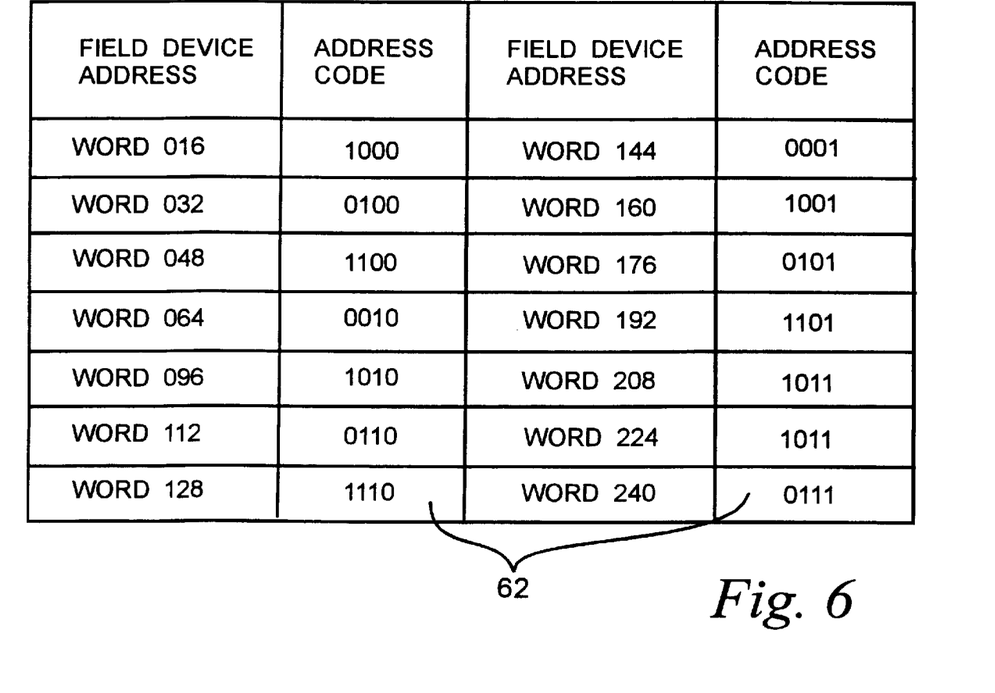
FIG. 6 is a table displaying field device addresses and their associated address codes in accordance with the present invention.
Figure 7:
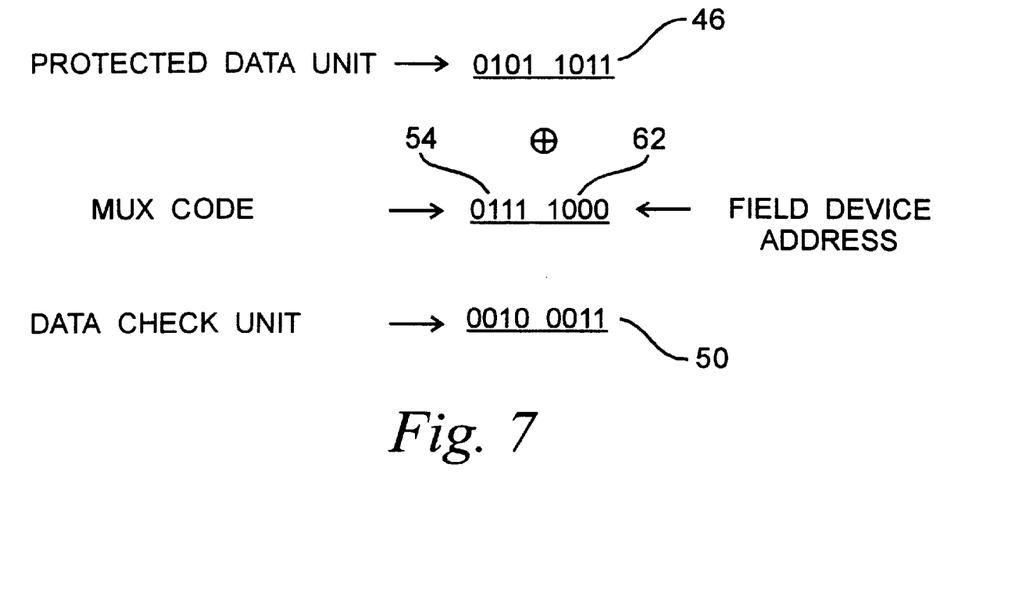
FIG. 7 is a graphical representation of a data check unit formed from particular combination of the protected data unit, multiplex channel address code and field device address code in accordance with the present invention.
Figure 8:
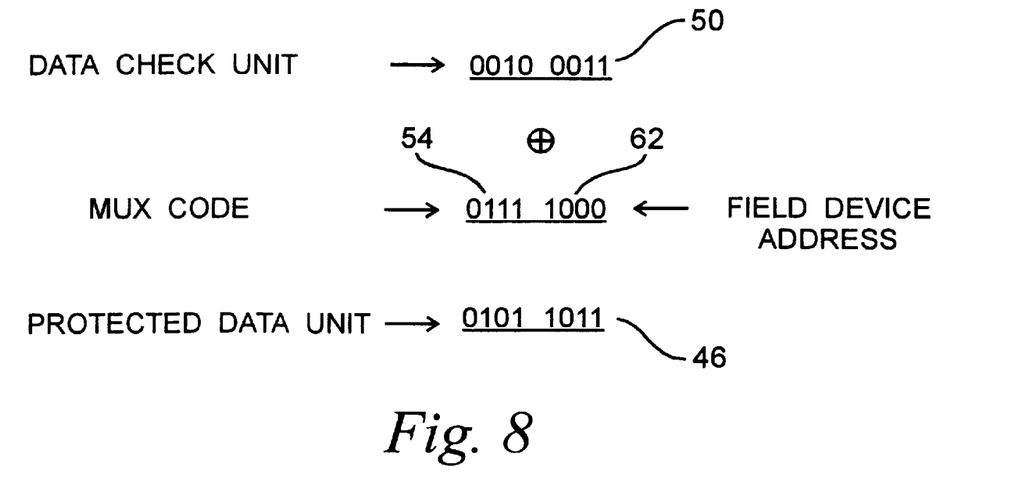
FIG. 8 is a graphical representation of the decoding process performed by the receiving field device on the received data check unit of FIG. 7 by exactly reversing the particular combination of the protected data unit, multiplex channel address code and field device address code which produced the data check unit in accordance with the present invention.

A third embodiment of the data error detection method of the present invention is illustrated in FIGS. 7 and 8 and is described below. In this embodiment, a data check unit 50 is comprised of a particular combination of the protected data unit 46, the multiplex channel address code 54, and the address of the particular field device 14 or 18 to which the protected data unit 46 is addressed. The address of each field device can also be indicated by an associated field device address code 62 in the form of a binary number, as shown in the table of FIG. 6. In the example of FIG. 7, the data check unit 50 is a particular binary number resulting from the particular method of combining of the protected data unit 46, the multiplex channel address code 54 and the field device address code 62. In this example the protected data unit 46 is the same byte sized unit used in the time slot bleedover example above (0101 1011). The multiplex channel address code 54 and the field device address code 62 used in this example are both one-half a byte or four bits 30 in length and are taken from the tables of FIGS. 5 and 6. The multiplex channel address code 54 from multiplex channel 1 of FIG. 5 and the field device address code 62 from Word 016 of FIG. 6 are exclusively OR'ed (⊕) with the protected data unit 46 to produce the data check unit 50.

As shown in FIG. 8, the addressed field device 14 or 18 performs the data error check by exactly reversing the particular combination of the protected data unit 46, the multiplex channel address code 54, and the field device address code 62. In this example, data error checking is accomplished by exclusively OR'ing the received data check unit 50 with the multiplex channel address code 54 and the field device address code 62 in exactly the same order in which the multiplex channel address code 54 and the field device address code 62 were exclusively OR'ed with the protected data unit 46 to produce the data check unit 50. This produces the protected data unit 46 which is then checked bit-by-bit by the receiving field device 14 or 18 with the received protected data unit 46. By combining the protected data unit 46 with the multiplex channel address code 54 and the field device address code 62 to produce the data check unit 50, data errors from transmission line noise or time slot bleedover in any of the protected data unit 46, the multiplex channel address code 54 or the field device address code 62 can be detected. The particular combination illustrated in FIGS. 7 and 8 is shown for example only and is not to be considered as the only combination which will produce the data error detection method in accordance with the present invention.

Figure 9:
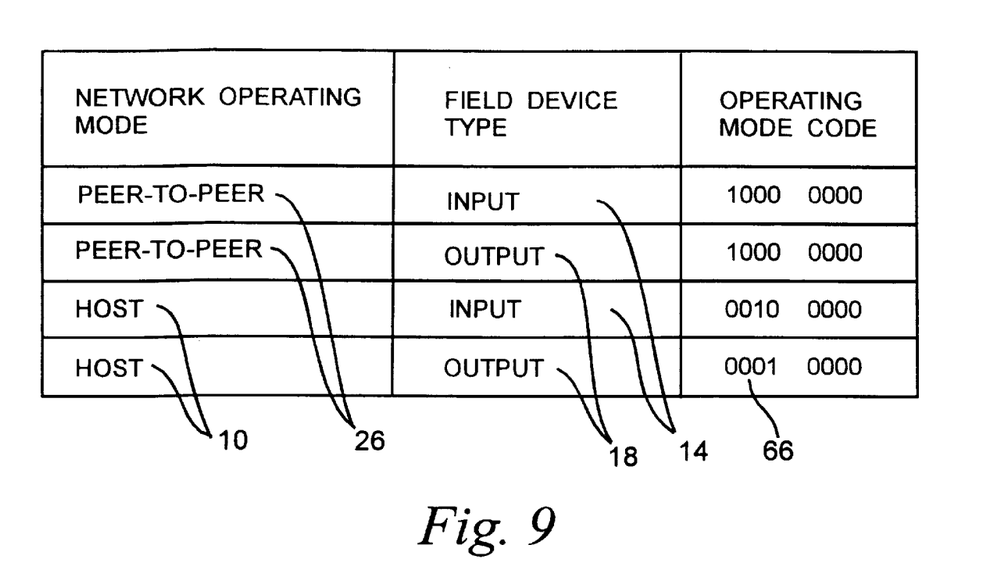
FIG. 9 is a table displaying network mode and field device types and their associated operating mode codes in accordance with the present invention.
Figure 10:
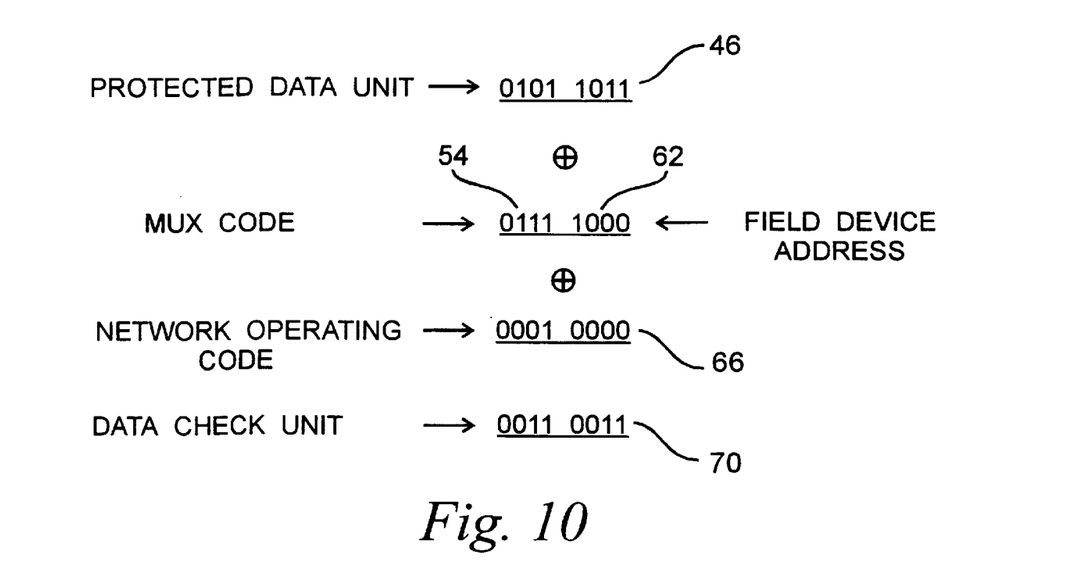
FIG. 10 is a graphical representation of the encoding process performed by the sending field using a particular combination of the protected data unit, multiplex channel address code, field device address code and network operating mode code which produced the data check unit in accordance with the present invention.

In a fourth embodiment, a predetermined response to confirmed corrupted data is also protected. The predetermined response to corrupted data can be different depending on the operating mode (host or peer-to-peer) of the network and the type of field device (input 14 or output 18) placing the protected data unit 46 on the network. In this embodiment, a network operating mode code 66 is exclusively OR'ed with the multiplex channel address code 54 and the field device address code 62 as described above to produce a data check unit 70. The network operating mode code 66 reflects a combination of the operating mode (host or peer-to-peer) of the network, 10 or 26 respectively, and the type of field device 14 or 18 (input 14 or output 18) placing the protected data unit 46 on the network. The network operating mode code 66 is in the form of a binary number of particular value as shown in the network operating mode code table of FIG. 9. The particular binary value assigned to a particular network operating mode code 66 is a network user selectable value. In a peer-to-peer network 26, the network operating mode code 66 will most likely be the same for both input and output devices, 14 or 18, respectively, as shown in FIG. 9, since these devices communicate directly with each other without a host 22 interface. FIG. 10 illustrates a data check unit 70 derived from the particular combination of the protected data unit 46 used in the previous example of FIGS. 7 and 8, the multiplex channel address code 54 of multiplex channel 1 from FIG. 5, the field device address code 62 of Word 016 from FIG. 6, and the mode code 66 representing an output device 18 on a host network 10 from FIG. 9. The addition of the mode code 66 to the particular combination of the protected data unit 46, multiplex channel address code 54, and field device address code 62 ensures that a field device 14 or 18 receiving the protected data unit 46 will respond properly if the data error detection evaluation in accordance with the present invention indicate that an error in the protected data unit 46 or data check unit 70 has been confirmed. This is important; since, as will be described below, a predetermined response by the field device 14 or 18 confirming data error in either the received protected data unit 46 or the data check unit 70 can be different depending on the network mode and/or the type of field device 14 or 18 receiving the corrupted data.

Figure 11:
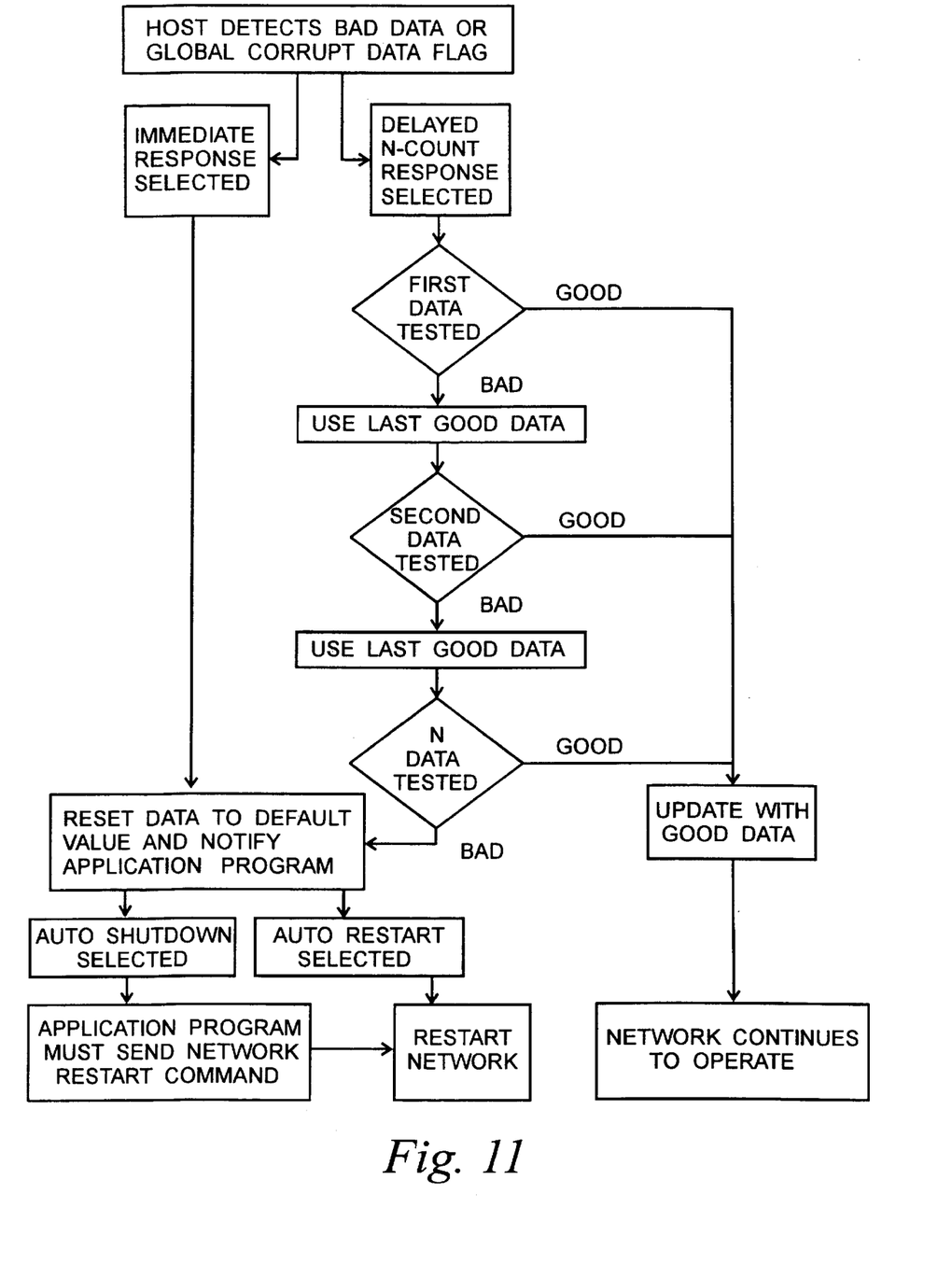
FIG. 11 is a flow chart representing the actions of a host upon receiving a confirmed data error in accordance with the present invention.

FIG. 11 is a flow chart illustrating one example of the actions which can be taken by the host 22 upon the confirmed receipt of corrupt data in a particular protected data unit 46. The host 22 can be selectively programmed to respond immediately or delay its response for a selectable number of frames 42 within which verified good data must be received for the particular protected data unit 46. If immediate response is selected, the corrupted data in the particular protected data unit 46 will be reset with the default value for the particular field device 14 or 18 associated with the corrupted protected data unit 46 and a global error notice will be issued to the application program by the host 22. If delayed response is selected, the particular protected data unit 46 will maintain the last valid data until the selected number of frames 42 have occurred or until the next verified good data is received for the particular protected data unit 46. If verified good data is received within the selected number of frames 42, the particular protected data unit 46 will be updated with the newly verified data and the network 10 will continue to operate in a normal manner. If verified good data is not received within the selected number of frames 42, the particular protected data unit 46 will be reset to the default value for the particular field device 14 or 18 associated with the corrupted protected data unit 46 and a global error notice will be issued to the application program by the host 22. The host 22 can also be selectably programmed to automatically shutdown the network 10 or automatically restart the network 10 after resetting the particular protected data unit 46 to its default value. If automatic restart is selected, the network 10 will continue to operate normally after the particular protected data unit 46 has been reset to its default value. If automatic shutdown is selected, the network 10 will be shut down by the host and will not be restarted until a command is initiated by the application program.

Figure 12:
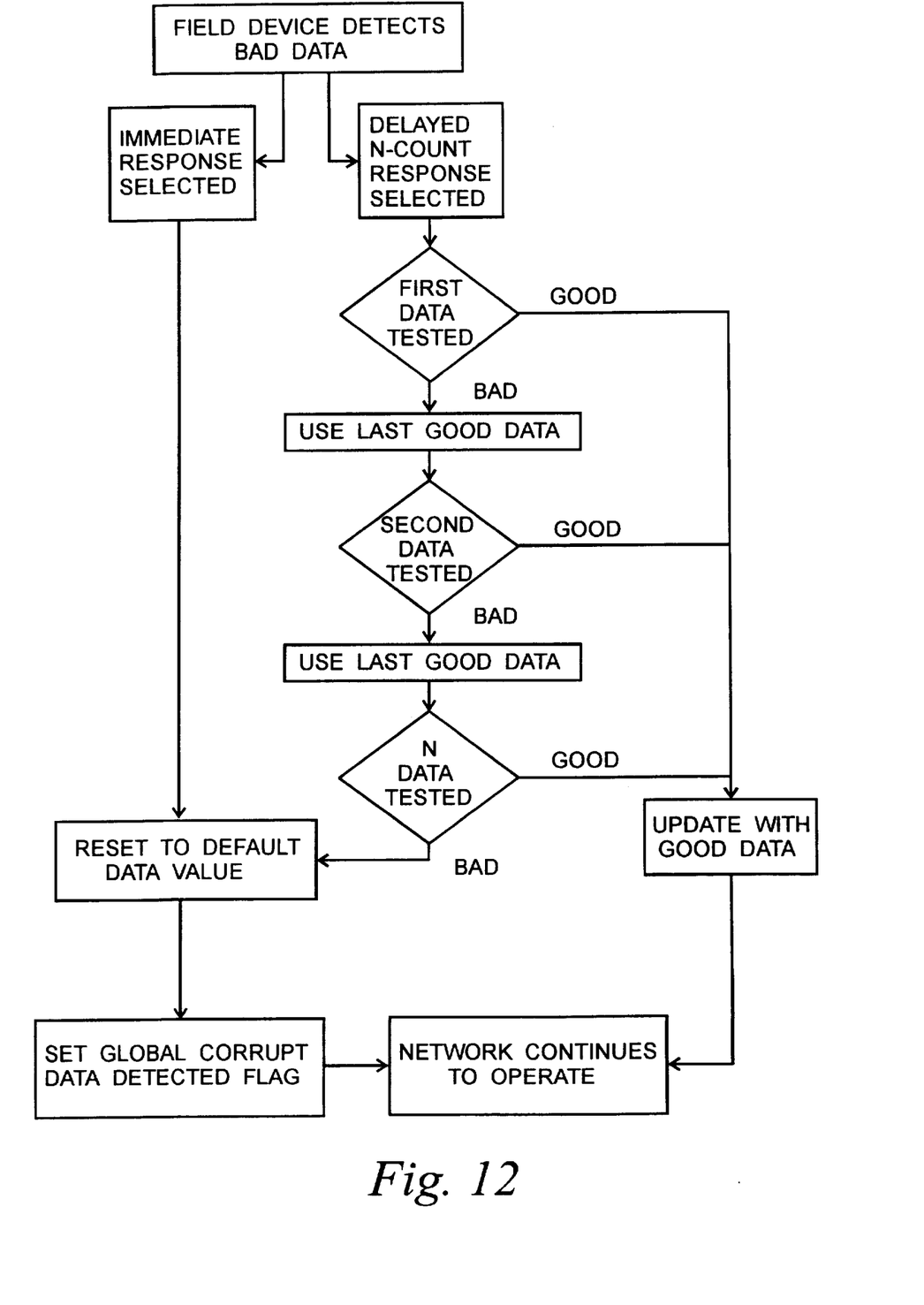
FIG. 12 is a flow chart representing the actions of a field device upon receiving a confirmed data error in accordance with the present invention.

FIG. 12 is a flow chart illustrating one example of the actions which can be taken by a field device 14 or 18 upon the confirmed receipt of corrupt data in a particular protected data unit 46. Each field device 14 or 18 can be selectably programmed by software or hardware to respond immediately or delay its response for a selectable number of frames 42 within which verified good data must be received for the particular protected data unit 46. If immediate response is selected, the corrupted data in the particular protected data unit 46 will be reset with the default value for the particular field device associated with the corrupted protected data unit 46 and the host 22 will be notified that a data fault has occurred by setting a global system flag in the next frame 42. The flag may or may not identify the address of the field device 14 or 18 indicating the data fault. If delayed response is selected, the particular protected data unit 46 will maintain the last valid data until the selected number of frames 42 have occurred or until the next verified good data is received by the particular protected data unit 46. If verified good data is received within the selected number of frames 42, the particular protected data unit 46 will be updated with the newly verified data, the corrupt data counter will be reset and the network will continue to operate in a normal manner. If verified good data is not received within the selected number of frames 42, the particular protected data unit 46 will be reset to the default value for the particular field device 14 or 18 associated with the corrupted protected data unit 46 and the host 22 will be notified that a data fault has occurred by setting a global system flag in the next frame 42. The flag may or may not identify the address of the field device 14 or 18 indicating the data fault. If the host 22 has been selectively programmed to automatically shutdown the network 10 upon receiving a notification of data fault from any field device 14 or 18 the network 10 will be shutdown and can only be restarted by a command from the application program.

Actions which can be taken by a field device 14 or 18 when installed on a peer-to-peer network 26, as described in FIG. 2, are generally the same as discussed above with reference to FIG. 12. The main exception being that the time slot generator 32 can shutdown the network 26 upon receiving a notification of data fault from any field device 14 or 18 or if good data is not received within the selected number of frames in the same manner as the host 22 does in a host network 10.

It is to be understood that the invention disclosed herein is not limited to the codes and particular combinations of codes and data or predetermined responses to detected data error as provided for example purposes in this application. The scope of the invention as claimed is intended to cover any method of data error detection which incorporates a combination of the data to be protected and one or more codes representing some characteristic of the network or field devices which the network user might select.

We claim:

1. A data error detecting method for use in a bit, byte or word oriented network, said data error detection method comprising the steps of:

sending a protected data unit from a host device or a first field device to said host device and/or at least one other field device being associated with a particular network address during a particular data frame, said protected data unit including a particular number of data bits each having a particular binary value;

sending a data check unit from said host device or said first field device to said host device and/or said at least one other field device being associated with said particular network address during said particular data frame, said data check unit including said particular number of data bits wherein each data bit of said data check unit is an exact binary complement to a corresponding data bit of said protected data unit;

confirming that neither said protected data unit nor said data check unit sent by said host device or said first field device to said host device and/or said at least one other field device associated with said particular network address have been corrupted while moving across the network by comparing each data bit of a received data check unit with its corresponding data bit of a received protected data unit; and accepting or rejecting said received protected data unit based on the results of said bit-by-bit comparison.

2. The data error detecting method of claim 1 wherein said data check unit is derived from said protected data unit by using software.

3. The data error detecting method of claim 1 wherein said data check unit is derived from said protected data unit by using hardware.

4. The data error detecting method of claim 1 wherein said bit-by-bit comparison of said received protected data unit and said received data check unit is accomplished by software.

5. The data error detecting method of claim 1 wherein said bit-by-bit comparison of said received protected data unit and said received data check unit is accomplished by hardware.

6. The data error detecting method of claim 1 wherein each bit of said data check unit is in reverse order of its associated bit in said protected data unit.

7. A data error detecting method for use in a bit, byte or word oriented network, said data error detection method comprising the steps of:

sending a protected data unit from a host device or a first field device to said host device and/or at least one other field device being associated with a particular network address during a particular data frame, said protected data unit including a particular number of data bits each having a particular binary value;

sending a data check unit from said host device or said first field device to said host device and/or said at least one other field device being associated with said particular network address during said particular data frame, said data check unit including said particular number of data bits wherein each data bit of said data check unit is arranged in reverse order to its corresponding data bit of said protected data unit and is an exact binary complement to its corresponding data bit of said protected data unit;

confirming that neither said protected data unit nor said data check unit sent by said host device or said first field device to said host device and/or said at least one other field device associated with said particular network address have been corrupted while moving across the network by reversing the order of each bit of said received data check unit and then comparing each data bit of said received data check unit with its corresponding data bit of said received protected data unit; and accepting or rejecting said received protected data unit based on the results of said bit-by-bit comparison.

8. The data error detecting method of claim 7 wherein said data check unit is derived from said protected data unit by using software.

9. The data error detecting method of claim 7 wherein said data check unit is derived from said protected data unit by using hardware.

10. The data error detecting method of claim 7 wherein said bit-by-bit comparison of said protected data unit and said data check unit is accomplished by software.

11. The data error detecting method of claim 7 wherein said bit-by-bit comparison of said protected data unit and said data check unit is accomplished by hardware.

12. A data error detecting method for use in a bit, byte or word oriented network, said data error detection method comprising the steps of:

sending a protected data unit from a host device or a first field device to said host device and/or at least one other field device being associated with a particular network address during a particular data frame, said protected data unit including a particular number of data bits each having a particular binary value;

sending a data check unit from said host device or said first field device to said host device and/or said at least one other field device being associated with said particular network address during said particular data frame, said data check unit including said particular number of data bits wherein each data bit of said data check unit is derived from a particular combination of said protected data unit and said particular network address of said at least one other field device;

confirming that neither said protected data unit nor said data check unit have been corrupted while moving across the network from said host device and/or said first field device to said host device or said at least one other field device by first deriving a protected data unit from a received data check unit by reversing said particular method of deriving said data check unit and then comparing each data bit of said derived protected data unit with its corresponding data bit of a received protected data unit; and accepting or rejecting said received protected data unit based on the results of said bit-by-bit comparison.

13. The data error detecting method of claim 12 wherein said particular manner of deriving said data check unit is accomplished by using software.

14. The data error detecting method of claim 12 wherein said particular manner of deriving said data check unit is accomplished by using hardware.

15. The data error detecting method of claim 12 wherein said particular manner of reverse deriving a protected data unit from said received data check unit is accomplished by using software.

16. The data error detecting method of claim 12 wherein said particular manner of reverse deriving a protected data unit from a received data check unit is accomplished by using hardware.

17. The data error detecting method of claim 12 wherein said bit-by-bit comparison of said derived protected data unit and said received protected data unit is accomplished by using software.

18. The data error detecting method of claim 12 wherein said bit-by-bit comparison of said derived protected data unit and said received protected data unit is accomplished by using hardware.

19. A data error detecting method for use in a bit, byte or word oriented network, said data error detection method comprising the steps of:

sending a protected data unit from a host device or a first field device to said host device and/or at least one other field device being associated with a particular network address and a particular multiplex channel of the network during a particular data frame, said protected data unit including a particular number of data bits each having a particular binary value;

sending a data check unit from said host device or said first field device to said host device and/or said at least one other field device being associated with said particular network address and multiplex channel of the network during said particular data frame, said data check unit including said particular number of data bits wherein each data bit of said data check unit is derived in a particular manner from said protected data unit, said particular network address of said at least one other field device and said multiplex channel;

confirming that neither said protected data unit nor said data check unit have been corrupted while moving across the network from said host device or said first field device to said host device and/or said at least one other field device by first deriving a data check unit from a received protected data unit using said particular method of deriving and then comparing each data bit of said derived data check unit with its corresponding data bit of a received data check unit; and accepting or rejecting said received protected data unit based on the results of said bit-by-bit comparison.

20. The data error detecting method of claim 19 wherein said particular manner of deriving said data check unit is accomplished by using software.

21. The data error detecting method of claim 19 wherein said particular manner of deriving said data check unit is accomplished by using hardware.

22. The data error detecting method of claim 19 wherein said particular manner of deriving a data check unit from said received protected data unit is accomplished by using software.

23. The data error detecting method of claim 19 wherein said particular manner of deriving a data check unit from said received protected data unit is accomplished by using hardware.

24. The data error detecting method of claim 19 wherein said bit-by-bit comparison of said derived data check unit and said received data check unit is accomplished by using software.

25. The data error detecting method of claim 19 wherein said bit-by-bit comparison of said derived data check unit and said received data check unit is accomplished by using hardware.

26. A data error detecting method for use in a bit, byte or word oriented network, said data error detection method comprising the steps of:

sending a protected data unit from a host device or a first field device to said host device and/or at least one other field device being associated with a particular network address during a particular data frame, said protected data unit including a particular number of data bits each having a particular binary value;

sending a data check unit from said host device or said first field device to said host device and/or said at least one other field device associated with said particular network address during said particular data frame, said data check unit including said particular number of data bits, each data bit having a particular binary value being derived in a particular manner from said protected data unit and one or more selectable binary codes;

confirming that neither said protected data unit nor said data check unit sent by said host device or said first field device and received by said host device and/or said at least one field device associated with said particular network address have been corrupted while moving across the network; and accepting or rejecting said protected data unit based on said confirming.

27. The data error detecting method of claim 26 wherein said particular manner of deriving said data check unit from said protected data unit and said one or more selectable binary codes is accomplished by using software.

28. The data error detecting method of claim 26 wherein said particular manner of deriving said data check unit from said protected data unit and said one or more selectable binary codes is accomplished by using hardware.

29. The data error detecting method of claim 26 wherein each said selectable binary code represents a particular characteristic of the network or said first field device chosen by the network administrator.

30. The data error detecting method of claim 26 wherein said particular manner of deriving said data check unit is chosen by said network administrator.

31. The data error detecting method of claim 26 wherein said confirming that said protected data unit or said data check unit have not been corrupted is accomplished by reversing said particular combination of a received data check unit and then comparing each data bit of said received data check unit with its corresponding data bit of a received protected data unit.

32. The data error detecting method of claim 26 wherein said confirming that said protected data unit or said data check unit have not been corrupted is accomplished by deriving a data check unit from a received protected data unit using said particular combination of said received protected data unit and said one or more selectable binary codes and then comparing each data bit of said derived data check unit with its corresponding data bit of a received data check unit.

33. The data error detecting method of claim 19 wherein said confirming that neither said protected data unit nor said data check unit sent by said host device or said first field device and received by said host device or said at least one field device have been corrupted while moving across the network is accomplished by using software.

34. The data error detecting method of claim 26 wherein said confirming that neither said protected data unit nor said data check unit sent by said host device or said first field device and received by said host device or said at least one field device have been corrupted while moving across the network is accomplished by using hardware.

* * * * *